US012659317B2

(12) United States Patent
Warner et al.

(10) Patent No.: US 12,659,317 B2
(45) Date of Patent: Jun. 16, 2026

(54) SYSTEMS AND METHODS FOR INCREASING NETWORK SECURITY RELATED TO ACCESSING NETWORK SERVICES

(71) Applicant: Capital One Services, LLC, McLean, VA (US)

(72) Inventors: Paul Warner, Reston, VA (US); Sam Walczak, Columbia, MD (US); Nikhil Srikanth, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 315 days.

(21) Appl. No.: 18/348,322

(22) Filed: Jul. 6, 2023

(65) Prior Publication Data

US 2025/0016162 A1     Jan. 9, 2025

(51) Int. Cl.
*H04L 9/40*         (2022.01)
*G06F 16/22*       (2019.01)

(52) U.S. Cl.
CPC ........ *H04L 63/102* (2013.01); *G06F 16/2255* (2019.01); *H04L 63/108* (2013.01)

(58) Field of Classification Search
CPC ....... G06F 3/0622; G06F 3/0655; G06F 3/067
See application file for complete search history.

(56) References Cited

U.S. PATENT DOCUMENTS

| | | | |
|---|---|---|---|
| 11,582,221 B1 * | 2/2023 | Raj | H04L 63/06 |
| 2008/0104403 A1 * | 5/2008 | Gueron | H04L 9/3247 |
| | | | 713/181 |
| 2014/0108785 A1 * | 4/2014 | Lindteigen | H04L 9/0861 |
| | | | 713/156 |
| 2018/0332471 A1 * | 11/2018 | Zhu | H04L 63/061 |
| 2019/0005470 A1 * | 1/2019 | Uhr | H04L 9/3239 |
| 2019/0065560 A1 * | 2/2019 | Rojkov | G06F 16/2272 |
| 2020/0259660 A1 * | 8/2020 | Tewari | H04L 9/3236 |
| 2021/0306139 A1 * | 9/2021 | Wright | H04L 9/0869 |
| 2022/0014365 A1 * | 1/2022 | Sofia | H04L 63/102 |
| 2023/0393762 A1 * | 12/2023 | Liu | H04L 9/0838 |
| 2024/0143212 A1 * | 5/2024 | Tagra | G06F 3/0641 |

* cited by examiner

*Primary Examiner* — Jonathan A Bui
(74) *Attorney, Agent, or Firm* — Foley & Lardner LLP

(57)                 ABSTRACT

In some embodiments, increasing network security related to accessing network services may be facilitated. In some embodiments, a request to generate a composite hash with composite hash parameters may be received, where the composite hash parameters comprise (i) user information associated with a first user and (ii) a key. Based on the one or more composite hash parameters, a composite hash may be generated. The composite hash may be transmitted to a local auxiliary device, causing storage of the composite hash at the local auxiliary device. A graphical representation of the composite hash may be generated, and the graphical representation may be transmitted to a user device, where the graphical representation enables access to one or more network resources related to the user information associated with the first user.

20 Claims, 5 Drawing Sheets

Computer System 102

Communication Subsystem 112

Hashing Subsystem 114

Graphical Processing Subsystem 116

Authentication Subsystem 118

Database(s) 132

150

Client Device 104a

⋮

Client Device 104n

Auxiliary Device 106a

⋯

Auxiliary Device 106n

200

Display component(s) 202

Input component(s) 204

Communication component(s) 208

Processor(s) 206

Sensor(s) 210

Storage(s) 212

Application(s) 214

Application 214a

Application 214b

...

Application 214n

300

Display component(s) 302

Input component(s) 304

Communication component(s) 308

Processor(s) 306

Sensor(s) 310

Storage(s) 312

Application(s) 314

Application 314a

Application 314b

...

Application 314n

Dispensing component(s) 316

SYSTEMS AND METHODS FOR INCREASING NETWORK SECURITY RELATED TO ACCESSING NETWORK SERVICES

SUMMARY

In one aspect, methods and systems are described herein for increasing network security related to accessing network services. As an example, methods and systems are described herein for generating a graphical representation (e.g., a quick response (QR) code, image, barcode, etc.) of a composite hash to be used at a local auxiliary device to grant access to network resources.

In the context of accessing private content at publicly accessible local systems (e.g., kiosks, computers, devices, etc.), existing systems require users to provide user credentials (e.g., login credentials such as a username and password) to gain access to content. As an example, a user who would like to view a photo album of vacation pictures that they are currently experiencing may visit a kiosk and provide their user credentials to view such images. Upon providing the user credentials, a backend system may process the user credentials, determine a match between the user-provided credentials, and enable the user to access such network resources. As part of transmitting a request to gain access to the content (e.g., an access request), existing systems may use public or private key encryption algorithms to protect the user's credentials. While doing so may help prevent malicious entities from stealing the user's credentials or sensitive user information (e.g., personally identifiable information (PII) such as names, location information, photographs of the user, etc.), advances in cyberattack techniques have enabled malicious entities to nonetheless obtain sensitive user information (e.g., access credentials, PII, etc.).

For instance, such techniques rely on the transmission of access requests over one or more computing networks (e.g., local area networks (LAN), wide area networks (WAN), the Internet, etc.). Malicious entities may leverage this and engage in man-in-the-middle attacks, monitor for sensitive information, or access the local system to obtain one or more private keys for use in decrypting encrypted messages or requests. As such, verifying user credentials over one or more computing networks can cause an increased risk of malicious entities gaining unapproved access to sensitive user information.

Another common problem with existing systems is their lack of a mechanism to enable users to share user credentials securely and privately. For example, where an account holder would like to share their credentials with another user (e.g., family member, friend, etc.) to view private content (e.g., a photo album) at publicly accessible local systems with the same permissions as the account holder, the account holder must provide their credentials to the user. Providing such credentials via pen and paper, email, text messages, or other avenues may enable malicious entities to obtain user credentials, giving them privileged access to private data.

To address these problems, methods and systems described herein may generate a cryptographic composite hash of user-specific information that corresponds to a key to be stored at a local auxiliary device and generate a graphical representation of the composite hash that is securely shareable. For example, as opposed to existing systems using public/private key encryption algorithms to transmit user credentials or other user information for verification that may be compromised, hashing functions/methods are one-way methods that are irreversible—thereby preventing malicious attempts to gain access or read user-specific information or user credentials. In addition to generating a composite hash, a key that corresponds to the composite hash may be generated to further increase network security. For example, only users that possess both the composite hash and corresponding key may be authenticated for access to network resources, thereby providing an additional layer of security when accessing network resources. Moreover, by storing the cryptographic composite hash at a local auxiliary device, when a user provides the composite hash/key for authentication, the composite hash/key may be verified locally (e.g., without transmitting an access/authentication request over one or more computing networks), thereby preventing malicious entities from intercepting sensitive user information to gain access to network resources while also reducing network traffic caused by authentication requests.

Leveraging the strong security aspects of a composite hash of user information (e.g., credentials and other user-specific information), the systems and methods described herein may generate a graphical representation (e.g., a quick response code, image, barcode, etc.) of the composite hash to enable users to easily and securely share their credentials while improving the user experience. For example, as hashes (e.g., composite hashes or other hashes) are cumbersome, easily forgettable, and long randomized alphanumeric strings, generating a graphical representation of the composite hash eliminates the need for a user to remember cumbersome alphanumeric strings. Moreover, a user may provide the graphical representation of the composite hash to a friend or family member to easily share and enable access to the user's private content. As the graphical representation is a graphical representation of the composite hash, even if a malicious entity obtains the graphical representation (and thus the composite hash), the user credentials are obfuscated via the hashing method, thereby preventing malicious entities from obtaining the user's login credentials, further increasing network/data security while enhancing the user experience.

In some embodiments, the system may receive, from a first mobile device associated with a first user, a request to generate a composite hash with composite hash parameters, where the composite hash parameters comprise (i) user information associated with the first user and (ii) a key. Based on the composite hash parameters, the system may generate the composite hash. The system causes storage of the composite hash at a local auxiliary device by transmitting the composite hash to the local auxiliary device. The system may generate a graphical representation of the composite hash and transmit the graphical representation to a second mobile device, where the graphical representation enables access to one or more network resources related to the user information associated with the first user.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
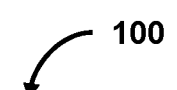
FIG. 1 shows a system for increasing network security related to accessing network services, in accordance with one or more embodiments.

FIG. 1 shows a system 100 for increasing network security related to accessing network services, in accordance with one or more embodiments. As shown in FIG. 1, system 100 may include computer system 102, client device 104 (or client devices 104a-104n), auxiliary device 106 (or auxiliary devices 106a-106n), or other components. Computer system 102 may include communication subsystem 112, hashing subsystem 114, graphical processing subsystem 116, authentication subsystem 118, or other components. Each client device 104 or auxiliary device 106 may include any type of mobile terminal, fixed terminal, or other device. By way of example, client device 104/auxiliary device 106 may include a desktop computer, a notebook computer, a tablet computer, a smartphone, a wearable device, or other client device. Users may, for instance, utilize one or more client devices 104 or auxiliary devices 106 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104 or auxiliary device 106. As used herein, "mobile device," "user device," and "client device" may be used interchangeably unless context dictates otherwise.

In some embodiments, system 100 increases network security related to accessing network services. While existing systems may encrypt user credentials using public/private key cryptography algorithms, malicious entities may nonetheless intercept such user credentials to gain access to resources associated with the user. For example, due to advances in cyberattacks, malicious entities may obtain public/private keys of a user (e.g., via malware, viruses, man-in-the-middle attacks, phishing schemes, etc.). Upon obtaining the public/private keys of a user, malicious entities can decrypt messages being sent from one system to another system over one or more computing networks (e.g., the Internet). To overcome this, system 100 generates a composite hash of composite hash parameters and causes storage of the composite hash at a local auxiliary device to enable access to one or more network resources. For example, by generating a composite hash of one or more composite hash parameters using a hash method, network security may be increased due to the strong security attributes associated with hashing methods. Namely, the one-way nature of hashing methods prevents malicious entities from intercepting public/private keys that may be used to decrypt sensitive user information included in the composite hash (e.g., the composite hash parameters). Additionally, by transmitting the composite hash to the local auxiliary device, when a user provides a graphical representation of the composite hash and provides a corresponding key associated with the hash, the local auxiliary device may locally authenticate the composite hash to enable the user to access one or more network services.

In some embodiments, system 100 may receive a request to generate a composite hash with composite hash parameters. For example, the composite hash parameters may include user information associated with a user, such as a user's name, date of birth, account number, credentials, access time, key, or other information. Using the composite hash parameters, system 100 may generate a composite hash. For example, system 100 may use a hash method (e.g., SHA-1. SHA-2, SHA-3, SHA-0, MD4, MD5, Whirpool, PIEMD, or other hash method) to generate a composite hash of the composite hash parameters. System 100 may cause storage of the composite hash at a local auxiliary device by transmitting the composite hash to the local auxiliary device. The local auxiliary device may be a local device (e.g., a laptop, desktop, computer, kiosk, fixed terminal, mobile terminal, etc.) that stores the composite hash for future authentication of a user-provided composite hash. System 100 may generate a graphical representation of the composite hash and transmit the graphical representation to a user device to enable access to one or more network resources related to the user information. By doing so, the system increases network security by hashing user information to generate a composite hash and transmitting the composite hash to a local auxiliary device for future authentication, thereby forgoing less secure transmission of plain text or encrypted user credentials that are susceptible to being compromised. Moreover, by generating a graphical representation of the composite hash of user information, the user may safely and securely share such graphical representation of the hashed user information to enable access to network resources related to the user information.

As an example, a user (e.g., an account holder) may generate a request to generate a composite hash comprising composite hash parameters that include user information associated with the user, such as account login credentials and a key. The key may be used to enable the user or another user, such as a friend, to access network resources when provided with the hash. System 100 may receive the request and generate the composite hash based on the composite hash parameters. Upon generating the composite hash, system 100 may cause storage of the composite hash at a local auxiliary device by transmitting the composite hash to the local auxiliary device. For instance, to enable the user (or alternatively, the user's friend) to gain access to the network resources, such as a photo album at a kiosk, system 100 transmits the composite hash to the kiosk to enable access to the photo album. The local auxiliary device may be configured to store the composite hash in response to receiving the composite hash to locally authenticate a user-provided hash and key, thereby increasing network security by forgoing authentication requests over one or more computing networks.

System 100 may additionally generate a graphical representation of the composite hash and transmit the graphical representation to a user device. For example, to ensure secure transmission of the composite hash that includes the user's credentials, system 100 transmits the graphical representation of the composite hash to a user device. The user device may be a device that is associated with the user (e.g., the account holder) or a device that is associated with the user's friend (e.g., to whom the user intends to give access to the photo album). The graphical representation may enable access to the network resources where a user presents the graphical representation and the key to the local auxiliary device. By doing so, the system improves the user experience, as the graphical representation of the composite hash eliminates the need for intended recipients to remember long and cumbersome hash values.

Subsystems 112-118

In some embodiments, communication subsystem 112 may receive a request to generate a composite hash. For example, communication subsystem 112 may receive a request from a mobile device (e.g., client device 104*a*) associated with a user to generate a composite hash with composite hash parameters. The composite hash parameters may be user information associated with the user and a key. In the context of financial services, the composite hash parameters may be a routing number, account number, financial account details, access time, location (e.g., location of an auxiliary device, automated teller machine (ATM), bank location, etc.), transaction amount, transaction amount range, expiration date, expiration time, timestamp (e.g., time/date at which the request is generated), or other information. Additionally or alternatively, the composite hash parameters may include a key. For example, the key may be a user-generated key (e.g., pin code, numerical value, alphanumerical value, etc.) to enable access to one or more network resources associated with the user. As another example, the key may be a randomly generated key or a predetermined key.

Figure 2:
FIG. 2 shows a client device, in accordance with one or more embodiments.
Figure 2:
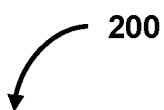

In some embodiments, with respect to FIG. 2, one or more operations related to increasing network security related to accessing network services may be performed by client device 200. In some embodiments, client device 200 may correspond to client device 104 (FIG. 1). Client device 200 may include a plurality of components, such as display component(s) 202, input component(s) 204, processor(s) 206, communication component(s) 208, sensor(s) 210, storage(s) 212, application(s) 214, or other components. In some embodiments, storage 212 may store a variety of applications. For example, applications 214*a*-214*n* may represent different applications stored on client device 200. As another example, application 214*a* may be an application that is configured as a web browser or other application for generating or otherwise creating requests to generate composite hashes via network 150. For example, application 214*a* may enable a user to log into a financial account associated with the user to generate a request for a composite hash. In some embodiments, communication components 208 may be configured for receiving or transmitting one or more messages (e.g., text messages, emails, instant messages, requests for composite hashes, etc.), receiving or transmitting content (e.g., multimedia), communicating with one or more components of system 100, or other functions, in accordance with one or more embodiments.

Figure 3:
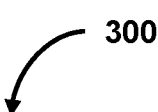
FIG. 3 shows an auxiliary device, in accordance with one or more embodiments.

In some embodiments, with respect to FIG. 3, one or more operations related to increasing network security related to accessing network services may be performed by auxiliary device 300. In some embodiments, auxiliary device 300 may correspond to auxiliary device 106 (FIG. 1). Auxiliary device 300 may include a plurality of components, such as display component(s) 302, input component(s) 304, processor(s) 306, communication component(s) 308, sensor(s) 310, storage(s) 312, application(s) 314, dispensing component(s) 316, or other components. In some embodiments, storage 312 may store a variety of applications, hashes, composite hashes, corresponding keys to composite hashes, composite hash parameters, or other information. For example, applications 314*a*-314*n* may represent different applications stored on auxiliary device 300. As another example, application 314*a* may be an application that is configured as a web browser or other application for providing access to network resources via network 150. For instance, application 314*a* may enable a user to obtain funds associated with the user information provided in a composite hash. As another example, application 314*a* may be an application that is associated with a financial service provider to authenticate user-provided information (e.g., graphical representations of composite hashes), enable access to funds associated with a user account, check or update financial account details, or other operations. In some embodiments, communication components 308 may be configured for receiving or transmitting one or more messages (e.g., text messages, emails, instant messages, etc.), receiving or transmitting content (e.g., multimedia), receiving or transmitting authentication requests (e.g., of composite hashes), receiving or transmitting invalidation requests, receiving or transmitting other commands, communicating with one or more components of system 100, or other functions, in accordance with one or more embodiments.

In some embodiments, input component(s) 304 may include a keypad or keyboard. For example, where auxiliary device 300 is an ATM, the ATM may include a keypad/keyboard to enable the user to input a key (e.g., associated with a composite hash) to authenticate the user or enable the ATM to provide access to funds. In some embodiments, sensor(s) 310 may include one or more image sensors, scanners, laser scanners, charge-coupled device (CCD) readers, video camera readers, large field-of-view readers, omnidirectional barcode scanners, pen-type readers, or other 1D or 2D QR code readers. For example, where auxiliary device 300 is an ATM, a user may present a graphical representation of a composite hash to sensor 310 to enable the ATM to read the composite hash. In some embodiments, dispensing component(s) 316 may dispense funds. For example, auxiliary device 300 may store funds, such as fiat cash, fiat coins, legal tenders, bank notes, or other funds. For instance, where auxiliary device 300 is an ATM, the ATM may dispense cash to a user via dispensing component 316.

In one use case, where an account holder would like to enable a friend, family member, or other recipient access to funds, the account holder may generate a request to generate a composite hash of the account holder's financial account details and a key. For instance, the account holder may interact with a financial service provider's (e.g., bank, credit union, etc.) software application on the account holder's mobile device (or other device associated with the account holder) to generate a composite hash. The account holder's financial account details may include a transaction amount, routing number, account number, and expiration date. Additionally, the account holder may interact with the software application (e.g., via the account holder's mobile device) to set or otherwise provide a pin code. The account holder may share the pin code with another user (e.g., friend, family member, or other recipient) via a telephone conference, text message, email, or other communication channel. Upon generating the request and providing the key, the account holder may generate the request to generate a composite hash to enable the other user to access funds from the account holder's account.

Referring back to FIG. 1, communication subsystem 112 may receive a request to generate a composite hash with composite hash parameters, over network 150, from client device 104a. For example, client device 104a may be a mobile device associated with a user from which the request to generate the composite hash originates. The request to generate the composite hash may include composite hash parameters, such as user information associated with the user (e.g., the account holder's financial account details), an access time, or a key. Communication subsystem 112 may provide the request to generate the composite hash to hashing subsystem 114.

Figure 4:
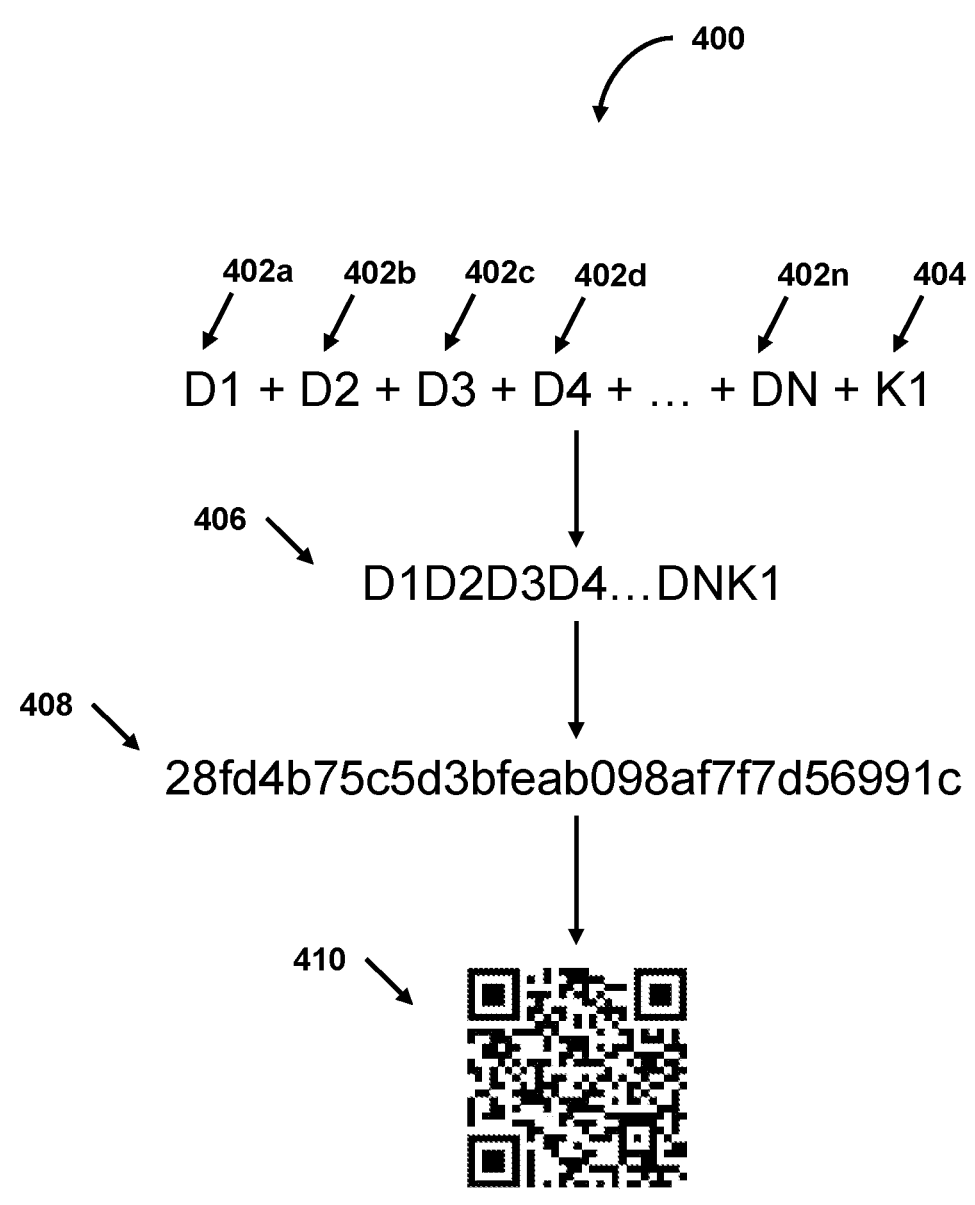
FIG. 4 shows an illustrative diagram of a composite hash process, in accordance with one or more embodiments.

As referred to herein, a "composite hash" may be a hash of one or more hash parameters. For example, each hash parameter may be appended or added together to form a composite hash parameter value, and the composite hash parameter value may be hashed using a hashing method to generate a composite hash of the hash parameters provided as input to the hashing method. For instance, referring to FIG. 4 showing a composite hash process 400, composite hash parameters 402a-402n may be user information associated with the first user. Each composite hash parameter of composite hash parameters 402a-402n may represent separate pieces of user information. For example, first composite hash parameter 402a may be an amount (e.g., a transaction amount), second composite hash parameter 402b may be a routing number of the user's financial account, third composite hash parameter 402c may be an account number of the user's financial account, and fourth composite hash parameter 402d may be an expiration date associated with the user's financial account (or an expiration date associated with the composite hash itself). Additionally or alternatively, key 404 may also be a composite hash parameter. For example, to ensure secure access to network resources, a key may be provided (e.g., by the user, by the financial service provider associated with the user's account, etc.) to enable authentication of a user's attempt to access network resources.

Each of composite hash parameters 402a-402n and key 404 may be appended or added together to form composite hash value 406. For instance, as shown in FIG. 4, composite hash value 406 represents composite hash parameters 402a-402n and key 404 appended together to create a composite hash value of the composite hash parameters 402a-402n and key 404. For example, referring back to FIG. 1, hashing subsystem 114 may receive the request to generate the composite hash with the composite hash parameters (e.g., from communication subsystem 112), and hashing subsystem 114 may generate the composite hash. For example, hashing subsystem 114 may use the composite hash parameters included in the request, append the composite hash parameters together to generate a composite hash parameter value, and provide the composite hash parameter value to a hashing method to generate the composite hash. Hashing subsystem 114 may hash the composite hash parameter value using any hash method such as SHA-1, SHA-2, SHA-3, SHA-0, MD4, MD5, Whirpool, PIEMD, or other hash method. For example, referring back to FIG. 4, composite hash value 406 may be hashed using a hash method such as MD5 to generate composite hash 408.

In some embodiments, the composite hash parameters may include a value associated with one or more network resources. For example, a user may specify a transaction amount to enable another user to obtain a specific amount (e.g., of funds from the user's financial account). When the system generates the composite hash, the transaction amount may be included into the composite hash. As such, when the graphical representation of the composite hash is generated, a user may present the graphical representation of the composite hash to a local auxiliary device (e.g., ATM) to enable the user access to the network resources. By doing so, the user may specify a given transaction amount to ensure a user cannot access unauthorized funds, thereby increasing account security while improving the user experience via the graphical representation.

In some embodiments, the composite hash parameters may include an access time associated with one or more network resources. For example, a user may specify a given time range for which one or more network resources may be obtained. For instance, when the system generates the composite hash, the access time (or alternatively, an access time range) may be included into the composite hash. As such, when the graphical representation of the composite hash is generated, a user may present the graphical representation of the composite hash to a local auxiliary device (e.g., ATM) to enable the user access to the network resources at, before, or during the specified access time. By doing so, the user may specify an access time to ensure a user cannot access unauthorized funds during unauthorized time periods, thereby increasing account security.

In some embodiments, referring back to FIG. 1, communication subsystem 112 may cause storage of the composite hash at a local auxiliary device. For example, hashing subsystem 114 may provide the composite hash to communication subsystem 112 to transmit the composite hash to a local auxiliary device. The local auxiliary device may be any device configured to enable access to one or more network resources. For instance, the local auxiliary device may be an ATM, kiosk, desktop computer, laptop computer, mobile terminal, fixed terminal, or other auxiliary device. The local auxiliary device may be configured to store composite hashes or other information. For example, where the local auxiliary device is an ATM, the ATM may store composite hashes, composite hash parameters, keys, or other information to enable local authentication of user-provided composite hashes or keys.

In some embodiments, the local auxiliary device may have one or more storages configured to store composite hashes and corresponding keys. For example, communication subsystem 112 may transmit the composite hash and the corresponding key to the local auxiliary device. As referred to herein, "corresponding" may represent one piece of information that is associated with another piece of information. For instance, a composite hash may correspond to a key such that the composite hash and key are considered a pair. To authenticate a composite hash, for example, where a user provides a user-provided composite hash and key, the local auxiliary device may query a database or other storage associated with the local auxiliary device to find a match between the user-provided composite hash and user-provided key to a stored composite hash and stored key. The local auxiliary device may store the composite hash and corresponding key in a data structure such as a dictionary, array, tree, or other data structure. In this way, the system may improve network security by enabling access to network resources when there is a match between a user-provided composite hash and user-provided key with a stored composite hash and stored key.

In some embodiments, the local auxiliary device may be configured to store composite hashes and corresponding keys upon receiving the composite hash and key. For example, in response to receiving the composite hash and corresponding key, the local auxiliary device may automatically store the composite hash and corresponding key for future authentication. Additionally or alternatively, the local auxiliary device may be configured to store a subset of composite hash parameters or other information. For example, the local auxiliary device may be configured to store composite hash parameters that do not include sensitive user information (e.g., account number, routing number, or other information that malicious entities seek). For instance, the local auxiliary device may store, in association with the composite hash and corresponding key, a specified amount (or range) for a transaction, an expiration time/date, an invalidation indication (e.g., to indicate that the transaction is expired or unexpired), or other information. As such, upon a user being granted access to network resources, the system can determine the correct amount of funds to dispense or ensure the transaction is not invalid/used/expired. In this way, network security is improved by ensuring that sensitive user information is protected while preserving necessary data for accessing network resources.

In some embodiments, the request to generate a composite hash may indicate a geographic location to which the composite hash is to be transmitted. For example, a user may want another user to access network resources at a given location but may be unaware of any local auxiliary devices at the location. The system may then identify, based on the geographic location, a second local auxiliary device at the location to transmit the composite hash to. For example, database 132 (FIG. 1) may store location information of local auxiliary devices, such as global positioning coordinates, addresses, or the like. As such, hashing subsystem 114 may query database 132 based on the geographic location to identify the local auxiliary device associated with the geographic location to which the composite hash is to be transmitted. The system may then transmit the composite hash to the local auxiliary device, which causes the composite hash to be stored at the local auxiliary device associated with the geographic location. In this way, the composite hash may be locally stored at the local auxiliary device at a given location to enable users to access network resources associated with a user's account.

In some embodiments, the request to generate a composite hash may indicate a specific local auxiliary device to which the composite hash is to be transmitted. For example, a user may be aware of a specific local auxiliary device from which another user is to access network resources. For instance, the specific local auxiliary device may be associated with an identifier such as a serial number or other identifier that is specific to the local auxiliary device. Database 132 (FIG. 1) may store identifiers of local auxiliary devices to enable local auxiliary device identification. As such, hashing subsystem 114 may query database 132 to obtain the identifier associated with the local auxiliary device to which the composite hash is to be transmitted. The system may then transmit the composite hash to the indicated local auxiliary device (e.g., based on the local auxiliary device identifier). In this way, the composite hash may be locally stored at a specific local auxiliary to enable users to access network resources associated with a user's account.

In some embodiments, graphical processing subsystem 116 may generate a graphical representation of the composite hash. For example, graphical processing subsystem 116 may generate a graphical representation of the composite hash where the graphical representation enables access to network resources related to the user information associated with the user. Graphical processing subsystem 116 may encode the composite hash into a graphical representation. For instance, the encoding may encode the composite hash into a QR code, a bar code, geometric shapes, Code 128, a data matrix, PDF417, Code 29, a universal product code, Code 39, or other encoding method that generates a graphical representation of information.

As an example, referring to FIG. 4, hashing subsystem 114 may provide graphical processing subsystem 116 with the composite hash 408. Graphical processing subsystem 116 may encode the composite hash 408 into a graphical representation 410. Although graphical representation 410 is shown as a QR code, it should be noted that other graphical representations may exist, in accordance with one or more embodiments. Graphical processing subsystem 116 may use an encoding method to encode the composite hash 408 into a graphical representation 410 of the composite hash. In this way, the system improves the user experience as users need not remember long and cumbersome composite hashes but rather simply have access to a graphical representation of a composite hash. Moreover, in this way, the system improves data security as malicious actors cannot easily read data encoded into a QR code without a scanning device.

Referring back to FIG. 1, graphical processing subsystem 116 may communicate with communication subsystem 112 to transmit the graphical representation to a user device. For example, in response to generating the graphical representation of the composite hash, communication subsystem 112 may transmit the graphical representation to a mobile device (or other device) of a second user. The second user may be an intended recipient of the composite hash, such as a friend, family member, or other recipient, to enable access to network resources related to the user information associated with the user (e.g., the account holder). In some embodiments, the second user may be the user (e.g., the account holder) to enable the account holder access to network resources, such as funds, from a bank account in instances where the account holder has lost/does not have access to their financial account card (e.g., ATM card, bank card, credit card, debit card, etc.).

In some embodiments, the local auxiliary device may be configured to grant access to network resources. For example, the local auxiliary device may be configured to grant access to network resources based on a match between the composite hash stored at the local auxiliary device and information provided by a user. The information provided by the user may be the graphical representation of the composite hash, the composite hash itself, or a key corresponding to the composite hash (or graphical representation of the composite hash). For example, where a user presents the graphical representation of the composite hash to the local auxiliary device (e.g., via a sensor such as a barcode scanner), the local auxiliary device may decode the graphical representation of the composite hash to obtain the composite hash. In some embodiments, the local auxiliary device may identify a format of the graphical representation of the composite hash (e.g., a QR code, a bar code, a geometric shape, Code 128, a data matrix, PDF417, Code 29, a universal product code, Code 39, etc.) and select a decoding method to decode the graphical representation of the composite hash. For example, where the local auxiliary device includes authentication subsystem 118, authentication subsystem 118 may decode the graphical representation of the composite hash to determine a match between the composite hash that a user provided and a stored composite hash (e.g., that was transmitted to the local auxiliary device). In some embodiments, authentication subsystem 118 may determine a match between (i) the composite hash that the user provided and a user-provided key and (ii) a stored composite hash with a corresponding stored key. Upon identifying a match, the local auxiliary device may grant access to the network resources (e.g., funds, a specified amount of funds, etc.). For instance, the local auxiliary device may dispense funds to the user based on the match. In this way, the system improves network security related to accessing network resources by locally authenticating composite hashes, forgoing the need for authentication requests to be transmitted over one or more computing networks susceptible to malicious actor interception.

In some embodiments, the system may authorize access to the one or more network resources. In one use case where the authentication subsystem 118 is not part of the local auxiliary device (e.g., rather a server), the authentication subsystem 118 may receive, from the local auxiliary device, the composite hash value from the graphical representation and a user-provided key. The system may then query a database (e.g., database 132) to determine a match between (i) the composite hash that the user provided and a user-provided key and (ii) a stored composite hash with a corresponding stored key. For example, authentication subsystem 118 may query the database with the user-provided composite hash to identify a stored composite hash that matches the user-provided composite hash. Upon identifying the match, authentication subsystem 118 may identify a key that corresponds to the stored composite hash. Authentication subsystem 118 may compare the corresponding stored key to the user-provided key to determine a match. In response to determining the match, the system may transmit an authorization command to the local auxiliary device to enable a user to access the one or more network resources. In this way, the system may verify that an access attempt is valid based on the composite hash value and the corresponding key, thereby increasing network security related to accessing network resources.

In some embodiments, the system may invalidate a composite hash. For example, communication subsystem 112 may receive an indication, from the local auxiliary device, that the graphical representation has been used to access one or more network resources. For example, the indication that the graphical representation has been used to access network resources may be a message indicating that the local auxiliary device has dispensed funds to a user. For instance, the local auxiliary device may be configured to transmit the indication upon determining a match between the stored composite hash/corresponding key and a user-provided composite hash/corresponding key. Communication subsystem 112 may provide the indication to authentication subsystem 118 to invalidate the composite hash. For example, upon receiving the indication, the authentication subsystem 118 may invalidate the composite hash (or the graphical representation) to disable subsequent access to the network resources. In this way, the system may increase network security related to accessing network resources by preventing users from accessing network resources multiple times.

In some embodiments, in response to invalidating the composite hash, the system may transmit an invalidation request to the local auxiliary device to disable subsequent access attempts to the one or more network resources. For example, to prevent a double redemption of funds, upon invalidating the request, the authentication subsystem 118 may generate an invalidation request. Authentication subsystem 118 may provide the invalidation request to communication subsystem 112 to transmit the invalidation request to the local auxiliary device. For example, communication subsystem 112 may transmit the invalidation request to the local auxiliary device to remove the composite hash from a local storage of the local auxiliary device or otherwise invalidate the composite hash. The local auxiliary device may be configured to invalidate the composite hash (e.g., delete or update an invalidation indication of the composite hash, corresponding key, or other information) upon receiving the invalidation request. In this way, the system increases network security by preventing access to network resources when access to network resources has been granted.

In some embodiments, location information (or access time information) associated with a local auxiliary device may be used to locate composite hash and key combinations. For example, authentication subsystem 118 may receive a request to access network resources from a local auxiliary device that includes the composite hash (e.g., from the graphical representation), a key inputted by a user, location information indicating the location of the local auxiliary device, or access time information associated with an indicated time to access the network resources. The location information may be GPS coordinates, an address, a serial number of the local auxiliary device that is associated with a geographic location, or other location-related information. The access time may be a timestamp (e.g., time/date), a timestamp range, or other indication of an access time to which a user is permitted to access network resources. Authentication subsystem 118 may use the location information/access time to determine a subset of composite hash and key combinations from a set of sorted composite hash and key combinations stored in a database (e.g., database 132). For example, as database 132 may store composite hashes, corresponding keys to the composite hashes, and other information such as location information of which composite hashes were transmitted to a given local auxiliary device and access times of which a user is permitted to access network resources, authentication subsystem 118 may identify a set of composite hashes or composite hash and key combinations that are associated with the location information/access time information of a local auxiliary device.

For instance, authentication subsystem 118 may query the database with the location information or access time information to identify the set of composite hashes (or set of composite hash and key combinations) that are associated with the location information/access time information. For instance, by using the location information/access time information to determine the subset of composite hashes (or set of composite hash and key combinations), the system may narrow the scope of search when determining whether a composite hash and key combination (e.g., inputted by a user) is valid, thereby reducing authentication delays.

In response to determining the subset of composite hashes (or subset of composite hash and key combinations), authentication subsystem 118 may determine a match between the user-inputted composite hash and key and a composite hash and key combination stored at the database of the subset of composite hashes (or subset of composite hash and key combinations). For example, authentication subsystem 118 may determine whether a user-provided composite hash matches a stored composite hash and then determine whether the user-provided key matches the stored key that is associated with the stored composite hash. Additionally or alternatively, authentication subsystem 118 may determine whether a user-provided key matches a user-provided key and then determine whether the user-provided composite hash matches the stored composite hash that corresponds to the stored key. Additionally or alternatively, authentication subsystem 118 may determine whether both the user-provided composite hash and the user-provided key match a stored composite hash and stored corresponding key. In response to determining a corresponding composite hash and key combination, the system may transmit an authorization command to the local auxiliary device to enable a user access to network resources. For example, the authorization command may be a message indicating that the user is authorized or otherwise authenticated to access network resources.

Example Flowchart

Figure 5:
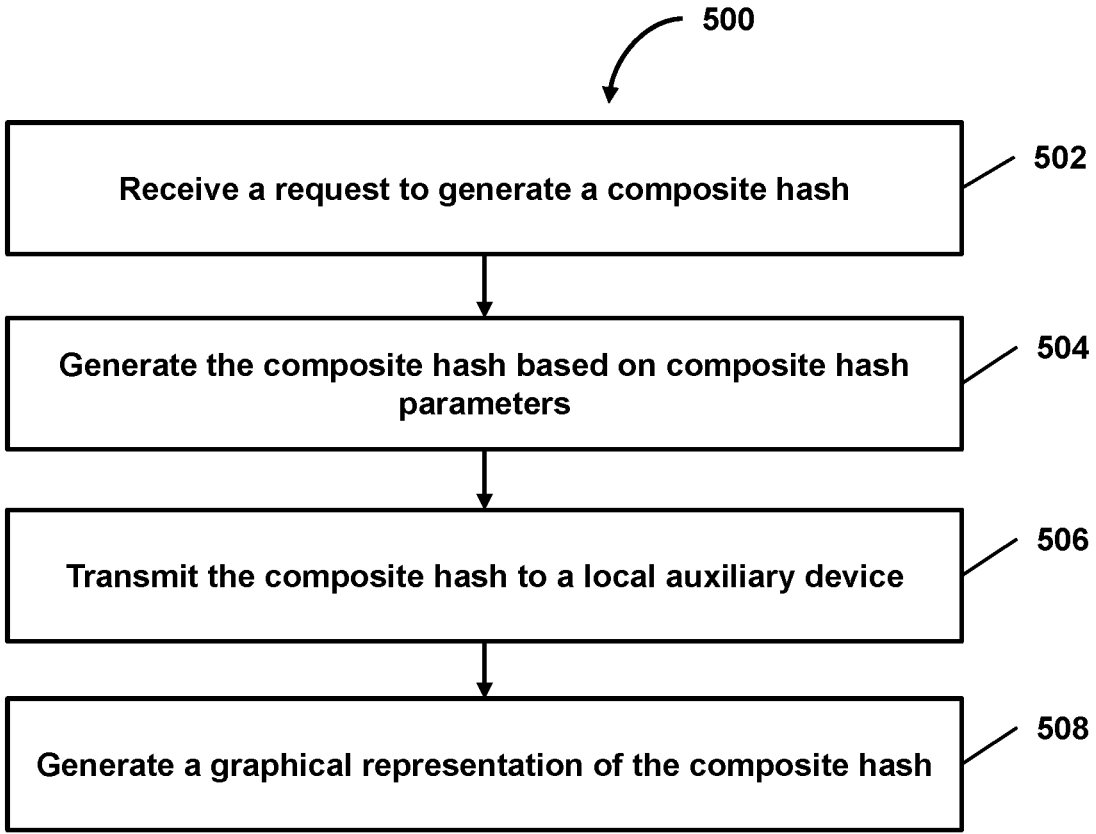
FIG. 5 shows a flowchart of a method for increasing network security related to accessing network services, in accordance with one or more embodiments.

FIG. 5 is an example flowchart of processing operations of a method 500 that enable the various features and functionality of the system as described in detail above. The processing operations of the method presented below are intended to be illustrative and non-limiting. In some embodiments, for example, the method may be accomplished with one or more additional operations not described and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 502, a request to generate a composite hash may be received. For example, the request to generate the composite hash may include composite hash parameters such as user information associated with a user and a key. Additionally or alternatively, the composite hash parameters may include an access time, location, or other information. The request to generate the composite hash may be transmitted from a mobile device associated with the user. Operation 502 may be performed by a subsystem that is the same or similar to communication subsystem 112, in accordance with one or more embodiments.

In operation 504, the composite hash may be generated based on composite hash parameters. For example, the composite hash may be a composite hash of the composite hash parameters. The composite hash may be generated using a hash method such as SHA-1, SHA-2. SHA-3, SHA-0, MD4, MD5, Whirpool, PIEMD, or other hash method. Operation 504 may be performed by a subsystem that is the same or similar to hashing subsystem 114, in accordance with one or more embodiments.

In operation 506, the composite hash may be transmitted to a local auxiliary device. For example, the composite hash may be transmitted to a local auxiliary device to cause storage of the composite hash at the local auxiliary device. For instance, the local auxiliary device may be configured to store the composite hash (or other information) in response to receiving the composite hash. The local auxiliary device may be any device or system configured to grant access to network resources. Operation 506 may be performed by a subsystem that is the same or similar to communication subsystem 112, in accordance with one or more embodiments.

In operation 508, a graphical representation of the composite hash may be generated. For example, the composite hash may be encoded into a graphical representation of the composite hash. The encoding may encode the composite hash into a QR code, a bar code, geometric shapes, Code 128, a data matrix, PDF417, Code 29, a universal product code, Code 39, or other encoding method that generates a graphical representation of information. In response to encoding the composite hash into a graphical representation, the graphical representation may be transmitted to a mobile device (or other device) associated with a user (e.g., an account holder, an intended recipient, etc.). Operation 508 may be performed by a subsystem that is the same or similar to graphical processing subsystem 116, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132 or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near-field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically store information. The storage media of the electronic storages may include one or both of (i) system storage that is provided integrally (e.g., substantially non-removable) with servers, client devices, local auxiliary devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, information obtained from local auxiliary devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software, hardware, or firmware; some combination of software, hardware, or firmware; and/or other mechanisms for configuring processing capabilities on the processors.

It should be appreciated that the description of the functionality provided by the different subsystems 112-118 described herein is for illustrative purposes and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method, the method comprising: receiving a request to generate a composite hash with composite hash parameters, the composite hash parameters comprising (i) user information associated with a first user and (ii) a key; generating, based on the one or more composite hash parameters, the composite hash; causing storage of the composite hash at a local auxiliary device by transmitting the composite hash to the local auxiliary device; and generating a graphical representation of the composite hash and transmitting the graphical representation to a user device, wherein the graphical representation enables access to one or more network resources related to the user information associated with the first user.

2. The method of the preceding embodiment, wherein generating the graphical representation of the composite hash is generated based on an encoding of the composite hash into the graphical representation.

3. The method of the preceding embodiments, further comprising: transmitting the graphical representation to a mobile device of (i) the user or (ii) a second user in response to encoding the composite hash into the graphical representation.

4. The method of any of the preceding embodiments, further comprising: determining, based on the request, a geographic location; identifying, based on the geographic location, a second local auxiliary device associated with the geographic location to which the composite hash is to be transmitted; and causing storage of the composite hash at the second local auxiliary device associated with the location by transmitting the composite hash to the second local auxiliary device.

5. The method of any of the preceding embodiments, further comprising: receiving, from the local auxiliary device, a request to access the one or more network resources, wherein the request comprises (i) the composite hash via the graphical representation, (ii) a candidate key inputted by a second user at the local auxiliary device, and (iii) location information associated with the local auxiliary device; identifying, by querying a database with the location information associated with the local auxiliary device, a set of composite hash and key combinations, wherein each composite hash and key combination of the set of composite hash and key combinations is associated with the location information; determining, based on the identified set of composite hash and key combinations associated with the location information, a corresponding composite hash and key combination, wherein the corresponding composite hash and key combination respectively matches the composite hash via the graphical representation and the candidate key inputted by the second user; and in response to determining the corresponding composite hash and key combination, transmitting an authorization command to the local auxiliary device to enable access to the one or more network resources.

6. The method of any of the preceding embodiments, further comprising: determining, based on the request, a second local auxiliary device to transmit the composite hash to, wherein the second local auxiliary device is associated with a geographic location; and causing storage of the composite hash at the second local auxiliary device by transmitting the composite hash to the second local auxiliary device.

7. The method of any of the preceding embodiments, wherein the composite hash parameters further comprise a first resource amount associated with the one or more network resources, and wherein the graphical representation enables access to the one or more network resources with respect to the first resource amount.

8. The method of any of the preceding embodiments, wherein the composite hash parameters further comprise an access time associated with the one or more network resources, and wherein the graphical representation enables access to the one or more network resources in accordance with the access time.

9. The method of any of the preceding embodiments, further comprising: receiving, from the local auxiliary device, a request to access the one or more network resources, wherein the request comprises (i) the composite hash via the graphical representation, (ii) a candidate key inputted by a second user at the local auxiliary device, and (iii) an access time associated with the request to access the one or more network resources; identifying, by querying a database with the access time, a set of composite hash and key combinations, wherein each composite hash and key combination of the set of composite hash and key combinations is associated with an access time range, the access time being within the access time range; determining, based on the identified set of composite hash and key combinations associated with the access time range, a corresponding composite hash and key combination, wherein the corresponding composite hash and key combination respectively matches the composite hash via the graphical representation and the candidate key inputted by the second user; and in response to determining the corresponding composite hash and key combination, transmitting an authorization command to the local auxiliary device to enable access to the one or more network resources.

10. The method of any of the preceding embodiments, further comprising: receiving, from the local auxiliary device, an indication of access to the one or more network resources related to the user information associated with the first user via the graphical representation; and in response to receiving the indication of access, invalidating the composite hash such that subsequent access to the one or more network resources via the composite hash is disabled.

11. The method of the preceding embodiment, further comprising: in response to invalidating the composite hash, causing an invalidation of the stored composite hash at the local auxiliary device by transmitting an invalidation request to the local auxiliary device.

12. The method of any of the preceding embodiments, further comprising: receiving, from the local auxiliary device, a request to access the one or more network resources, wherein the request comprises (i) the composite hash via the graphical representation and (ii) a candidate key inputted by a second user at the local auxiliary device; determining, by querying a database with the composite hash and the key, a corresponding key; determining a match between the corresponding key to the candidate key; and in response to determining the match, transmitting an authorization command to the local auxiliary device to enable access to the one or more network resources.

13. A tangible, non-transitory, machine-readable medium storing instructions that, when executed by a data processing apparatus, cause the data processing apparatus to perform operations comprising those of any of the foregoing method embodiments.

14. A system comprising: one or more processors; and memory storing instructions that, when executed by the processors, cause the processors to effectuate operations comprising those of any of the foregoing method embodiments.

What is claimed is:

1. A system for increasing network security related to accessing network services, the system comprising:

one or more processors executing computer program instructions that, when executed, cause operations comprising:

receiving, from a first mobile device associated with a first user, a request to generate a composite hash with composite hash parameters, the composite hash parameters comprising (i) user information associated with the first user, (ii) an access time, and (iii) a key;

generating, based on the composite hash parameters, the composite hash, wherein the composite hash is a hash of the composite hash parameters;

causing storage of the composite hash at a local auxiliary device by transmitting the composite hash to the local auxiliary device; and in response to encoding the composite hash into a graphical representation, transmitting the graphical representation to a second mobile device associated with a second user different from the first user, wherein the graphical representation enables the second user to access one or more network resources related to the user information associated with the first user by causing the local auxiliary device to grant access to the one or more network resources based on a match between the composite hash stored at the local auxiliary device and information provided by the second user.

2. A method, the method comprising:

receiving, from a first mobile device associated with a first user, a request to generate a composite hash with composite hash parameters, the composite hash parameters comprising (i) user information associated with the first user and (ii) a key;

generating, based on the composite hash parameters, the composite hash;

causing storage of the composite hash at a local auxiliary device by transmitting the composite hash to the local auxiliary device; and generating a graphical representation of the composite hash and transmitting the graphical representation to a second mobile device, wherein the graphical representation enables access to one or more network resources related to the user information associated with the first user by causing the local auxiliary device to grant access to the one or more network resources based on a match between the composite hash stored at the local auxiliary device and information associated with the second mobile device.

3. The method of claim 2, further comprising:

determining, based on the request, a geographic location;

identifying, based on the geographic location, a second local auxiliary device associated with the geographic location to which the composite hash is to be transmitted; and causing storage of the composite hash at the second local auxiliary device associated with the geographic location by transmitting the composite hash to the second local auxiliary device.

4. The method of claim 2, further comprising:

receiving, from the local auxiliary device, a request to access the one or more network resources, wherein the request comprises (i) the composite hash via the graphical representation, (ii) a candidate key inputted by a second user at the local auxiliary device, and (iii) location information associated with the local auxiliary device;

identifying, by querying a database with the location information associated with the local auxiliary device, a set of composite hash and key combinations, wherein each composite hash and key combination of the set of composite hash and key combinations is associated with the location information;

determining, based on the set of composite hash and key combinations, a corresponding composite hash and key combination, wherein the corresponding composite hash and key combination respectively matches the composite hash via the graphical representation and the candidate key inputted by the second user; and in response to determining the corresponding composite hash and key combination, transmitting an authorization command to the local auxiliary device to enable access to the one or more network resources.

5. The method of claim 2, further comprising:

determining, based on the request, a second local auxiliary device to transmit the composite hash to, wherein the second local auxiliary device is associated with a geographic location; and causing storage of the composite hash at the second local auxiliary device by transmitting the composite hash to the second local auxiliary device.

6. The method of claim 2, wherein the composite hash parameters further comprise a first resource amount associated with the one or more network resources, and wherein the graphical representation enables access to the one or more network resources with respect to the first resource amount.

7. The method of claim 2, wherein the composite hash parameters further comprise an access time associated with the one or more network resources, and wherein the graphical representation enables access to the one or more network resources in accordance with the access time.

8. The method of claim 2, further comprising:
receiving, from the local auxiliary device, an indication of access to the one or more network resources related to the user information associated with the first user via the graphical representation; and
in response to receiving the indication of access, invalidating the composite hash such that subsequent access to the one or more network resources via the composite hash is disabled.

9. The method of claim 8, further comprising:
in response to invalidating the composite hash, causing an invalidation of the stored composite hash at the local auxiliary device by transmitting an invalidation request to the local auxiliary device.

10. The method of claim 2, further comprising:
receiving, from the local auxiliary device, a request to access the one or more network resources, wherein the request comprises (i) the composite hash via the graphical representation and (ii) a candidate key inputted by a second user at the local auxiliary device;
determining, by querying a database with the composite hash, a corresponding key;
determining a match between the corresponding key and the candidate key; and
in response to determining the match, transmitting an authorization command to the local auxiliary device to enable access to the one or more network resources.

11. One or more A-non-transitory computer-readable media storing instructions that, when executed by one or more processors, cause operations comprising:
receiving a request to generate a composite hash with one or more composite hash parameters, the one or more composite hash parameters comprising (i) user information associated with a first user and (ii) a key;
generating, based on the one or more composite hash parameters, the composite hash;
causing storage of the composite hash at a local auxiliary device by transmitting the composite hash to the local auxiliary device; and
generating a graphical representation of the composite hash and transmitting the graphical representation to a user device, wherein the graphical representation enables access to one or more network resources related to the user information associated with the first user by causing the local auxiliary device to grant access to the one or more network resources based on a match between the composite hash stored at the local auxiliary device and information associated with the user device.

12. The one or more non-transitory computer-readable media of claim 11, wherein the operations further comprise:
determining, based on the request, a geographic location;

identifying, based on the geographic location, a second local auxiliary device associated with the geographic location to which the composite hash is to be transmitted; and
causing storage of the composite hash at the second local auxiliary device associated with the geographic location by transmitting the composite hash to the second local auxiliary device.

13. The one or more non-transitory computer-readable media of claim 11, wherein the operations further comprise:
receiving, from the local auxiliary device, a request to access the one or more network resources, wherein the request comprises (i) the composite hash via the graphical representation, (ii) a candidate key inputted by a second user at the local auxiliary device, and (iii) location information associated with the local auxiliary device;
identifying, by querying a database with the location information associated with the local auxiliary device, a set of composite hash and key combinations, wherein each composite hash and key combination of the set of composite hash and key combinations is associated with the location information;
determining, based on the set of composite hash and key combinations, a corresponding composite hash and key combination, wherein the corresponding composite hash and key combination respectively matches the composite hash via the graphical representation and the candidate key inputted by the second user; and
in response to determining the corresponding composite hash and key combination, transmitting an authorization command to the local auxiliary device to enable access to the one or more network resources.

14. The one or more non-transitory computer-readable media of claim 11, wherein the operations further comprise:
determining, based on the request, a second local auxiliary device to transmit the composite hash to, wherein the second local auxiliary device is associated with a geographic location; and
causing storage of the composite hash at the second local auxiliary device by transmitting the composite hash to the second local auxiliary device.

15. The one or more non-transitory computer-readable media of claim 11, wherein the one or more composite hash parameters further comprise a first resource amount associated with the one or more network resources, and wherein the graphical representation enables access to the one or more network resources with respect to the first resource amount.

16. The one or more non-transitory computer-readable media of claim 11, wherein the one or more composite hash parameters further comprise an access time associated with the one or more network resources, and wherein the graphical representation enables access to the one or more network resources in accordance with the access time.

17. The one or more non-transitory computer-readable media of claim 11, wherein the one or more composite hash parameters further comprise an access time associated with the one or more network resources, the operations further comprising:
receiving, from the local auxiliary device, a request to access the one or more network resources, wherein the request comprises (i) the composite hash via the graphical representation, (ii) a candidate key inputted by a second user at the local auxiliary device, and (iii) an access time associated with the request to access the one or more network resources;

identifying, by querying a database with the access time, a set of composite hash and key combinations, wherein each composite hash and key combination of the set of composite hash and key combinations is associated with an access time range, the access time being within the access time range;

determining, based on the set of composite hash and key combinations, a corresponding composite hash and key combination, wherein the corresponding composite hash and key combination respectively matches the composite hash via the graphical representation and the candidate key inputted by the second user; and in response to determining the corresponding composite hash and key combination, transmitting an authorization command to the local auxiliary device to enable access to the one or more network resources.

18. The one or more non-transitory computer-readable media of claim 11, wherein the operations further comprise:

receiving, from the local auxiliary device, an indication of access to the one or more network resources related to the user information associated with the first user via the graphical representation; and in response to receiving the indication of access, invalidating the composite hash such that subsequent access to the one or more network resources via the composite hash is disabled.

19. The one or more non-transitory computer-readable media of claim 18, wherein the operations further comprise:

in response to invalidating the composite hash, causing an invalidation of the composite hash stored at the local auxiliary device by transmitting an invalidation request to the local auxiliary device.

20. The one or more non-transitory computer-readable media of claim 11, wherein the operations further comprise:

receiving, from the local auxiliary device, a request to access the one or more network resources, wherein the request comprises (i) the composite hash via the graphical representation and (ii) a candidate key inputted by a second user at the local auxiliary device;

determining, by querying a database with the composite hash and the key, a corresponding key;

determining a match between the corresponding key and the candidate key; and in response to determining the match, transmitting an authorization command to the local auxiliary device to enable access to the one or more network resources.

* * * * *